United States Patent
Pieber et al.

(10) Patent No.: US 10,243,619 B2
(45) Date of Patent: Mar. 26, 2019

(54) NFC "SPLIT STACK" ARCHITECTURE

(71) Applicant: PANTHRONICS AG, Graz (AT)

(72) Inventors: Michael Pieber, Kumberg (AT); Tomaz Felicijan, Graz (AT); Jakob Jongsma, Graz (AT)

(73) Assignee: PANTHRONICS AG, Graz (AT)

( * ) Notice: Subject to any disclaimer, the term of this patent is extended or adjusted under 35 U.S.C. 154(b) by 0 days.

(21) Appl. No.: 15/769,652

(22) PCT Filed: Oct. 18, 2016

(86) PCT No.: PCT/EP2016/074955
§ 371 (c)(1),
(2) Date: Apr. 19, 2018

(87) PCT Pub. No.: WO2017/067916
PCT Pub. Date: Apr. 27, 2017

(65) Prior Publication Data
US 2018/0302124 A1   Oct. 18, 2018

(30) Foreign Application Priority Data

Oct. 22, 2015   (EP) .................................... 15190964

(51) Int. Cl.
*H04B 5/00* (2006.01)
*H04W 4/80* (2018.01)
(Continued)

(52) U.S. Cl.
CPC ......... *H04B 5/0031* (2013.01); *H04B 5/0056* (2013.01); *H04B 5/0062* (2013.01);
(Continued)

(58) Field of Classification Search
CPC .................................................. H04B 5/0031
See application file for complete search history.

(56) References Cited

U.S. PATENT DOCUMENTS

2009/0206984 A1* 8/2009 Charrat .................. H04L 63/08
340/5.2
2012/0178366 A1* 7/2012 Levy .................. G06K 7/10237
455/41.1
(Continued)

FOREIGN PATENT DOCUMENTS

EP         1 327 222 A1    7/2003
WO      2012/065643 A1    5/2012

OTHER PUBLICATIONS

Int'l Search Report and Written Opinion of the Int'l Searching Authority for Int'l Pat. App. No. PCT/EP2016/074955 dated Dec. 20, 2016, 11 pgs.
"NFC Controller Interface (NCI) Specification Technical Specification NFC Forum Contents", 146 pgs (2012); retrieved from the internet: http://www.cardsys.dk/download/NFC_Docs/NFC Controller Interface (NCI) Technical Specification.pdf.
(Continued)

*Primary Examiner* — Ankur Jain
(74) *Attorney, Agent, or Firm* — Merchant & Gould P.C.

(57) ABSTRACT

A device (5; 16; 26) that processes a Near Field Communication type application which device (5; 16; 26) comprises: a host controller circuit (3; 27) that processes device applications, that use the Near Field Communication type application, and that processes a host driver (7; 28) that communicates based on a first interface protocol (NCI; EMV); a NFC controller circuit (4; 33) that processes a Near Field Communication type contactless interface (6; 35) and a controller driver (11; 32) that interfaces with the host controller circuit (3; 27), wherein the host controller circuit (3; 27) processes a first transmission module (9; 30) that interfaces with the host driver (7; 28) based on the first interface protocol (NCI; EMV) and with the controller driver (11; 32) based on a second interface protocol, which first transmission module (9; 30) furthermore processes substantially all none-time critical and/or memory consuming tasks of the Near Field Communication type application and wherein the NFC controller circuit (4; 33) comprises a second transmission module (12, 34) that processes all time
(Continued)

critical tasks for the Near Field Communication type application towards the Near Field Communication type contactless interface (6; 35).

10 Claims, 6 Drawing Sheets

(51) Int. Cl.
 *H04L 29/06* (2006.01)
 *H04L 29/08* (2006.01)
(52) U.S. Cl.
 CPC ............... *H04L 69/08* (2013.01); *H04W 4/80* (2018.02); *H04L 67/104* (2013.01)

(56) References Cited

U.S. PATENT DOCUMENTS

2013/0165042 A1* 6/2013 Gillespie ............... H04W 76/38
 455/41.1
2015/0215435 A1* 7/2015 Hillan .................... H04L 69/08
 455/41.1

OTHER PUBLICATIONS

"UM10819 PN7120 User Manual", PN7120 User Manual for an NFC Controller by NXP, 120 pgs, (2015), retrieved from the internet: http://www.nxp.com/documents/application_note/UM10819.pdf.

Int'l Preliminary Report on Patentability for Int'l Pat. App. No. PCT/EP2016/074955 dated Feb. 22, 2018, 7 pgs.

\* cited by examiner

State of the Art

State of the Art

State of the Art

State of the Art

NFC "SPLIT STACK" ARCHITECTURE

This application is a National Stage Application of PCT/EP2016/074955, filed 18 Oct. 2016, which claims benefit of Serial No. 15190964.5, filed 22 Oct. 2015 with the European Patent Office, and which applications are incorporated herein by reference. To the extent appropriate, a claim of priority is made to each of the above disclosed applications.

FIELD OF THE INVENTION

The present invention relates to device that processes a Near Field Communication type application which device comprises:
a host controller circuit that processes device applications, that use the Near Field Communication type application, and that processes a host driver that communicates based on a first interface protocol;
a NFC controller circuit that processes a Near Field Communication type contactless interface and a controller driver that interfaces with the host controller circuit.

BACKGROUND OF THE INVENTION

Document US 2009/0206984 A1 discloses such a device like a mobile phone with Near Field Communication (NFC) functionality. NFC technology has been developed by an industry consortium under the name of NFC Forum (http://www.nfc-forum.ofg) and derives from RFID technology. NFC components may operate in a "Reader" mode, a "Card Emulation" mode and a "Peer-2-Peer" mode as standardized in ISO 18.092. An NFC component emits via its Near Field Communication contactless interface magnetic fields, sends data by modulating the amplitude of the magnetic field, and receives data by load modulation and inductive coupling. In the emulation mode, described for instance in EP 1 327 222 the NFC component operates passively like a transponder to engage in a dialog with another reader and to be seen by the other reader as an RFID chip.

The device disclosed in US 2009/0206984 A1 comprises a host controller circuit or mobile phone processor that processes all device applications relevant for the normal telephone functionality. These applications for instance enable to take a call, send a SMS or search the Internet. To add the Near Field Communication feature to this mobile phone a separate integrated circuit named NFC controller circuit has been added to this mobile phone. The NFC Forum Specification "NFC Controller Interface (NCI)" defines the interface protocol to be used to enable communication between the host controller circuit and the NFC controller circuit. The host controller circuit implements this NCI Interface with a stack of software named host driver that communicates based on the NCI interface with a stack of software named controller driver processed in the NFC controller circuit.

FIG. 1 shows such a typical set-up of a host controller circuit 1 and a NFC controller circuit 2 of a standard NFC architecture of a state of the art device. FIG. 2 shows a more detailed block diagram of functionalities processed within these two integrated circuits and a smart card (UICC) connected to the NFC controller circuit 2 via a Single Wire Protocol. The device host of the host controller circuit processes device applications that use the Near Field communication application partially processed in the device host and partially processed in the NCI-FW (Stack) of the NFC controller circuit 2. The NCI-FW (Stack) in this standard NFC architecture enables the communication with the host controller circuit 1 via the NCI interface as controller driver.

Drawback for this standard NFC architecture is a limited ability to update the part of the Near Field communication application processed in the NFC controller circuit 2. The NCI interface does not enable an easy and fast way of such an over the air update. In particular as most of the times the NFC controller circuit 2 for a mobile phone manufacturer is a third party integrated circuit with very limited influence on updates of firmware processed on the NFC controller circuit 2. Furthermore the NFC controller circuit 2 has only limited memory space and processing capacity compared to the host controller circuit 1, what limits the possibility to enable e.g. a multitude of new payment applications from different credit card companies.

Document WO 2012/065643 A1 furthermore discloses a device (e.g. mobile phone) that comprises a host controller circuit that processes device applications and a NFC controller circuit that processes and enables a Near Field Communication contactless interface. This document discloses a mechanism of routing data from the NFC controller circuit to different NFC Execution environments. The device disclosed in WO 2012/065643 A1 comprises the same drawbacks as stated above.

SUMMARY OF THE INVENTION

It is an object of the invention to provide a device and a method that processes standard compliant Near Field Communication type applications and the need for only limited processing power and memory of the NFC controller circuit.

This object is achieved with a device the host controller circuit processes a first transmission module with a controller driver, that interfaces with the host driver based on the first interface protocol, and with a host soft driver, that interfaces with the controller driver based on a second interface protocol, which first transmission module furthermore processes the establishment of an HCI network to allow card emulation with a UICC or Secure Element and wherein the.

NFC controller circuit comprises a second transmission module that processes the actual data exchange during card emulation application between the UICC or Secure Element and a peer device using the previously established HCI network during card emulation without the involvement of the host controller circuit.

This object is furthermore achieved with a method to process a Near Field Communication type application with a device that comprises:
a host controller circuit that processes device applications, that use the Near Field Communication type application, and that processes a host driver that communicates based on a first interface protocol and
a NFC controller circuit that processes a Near Field Communication type contactless interface and a controller driver that interfaces with the host controller circuit, wherein the following steps are processed:
  process a controller driver of a first transmission module with the host controller circuit to interface with the host driver based on the first interface protocol and
  process a host soft driver of the first transmission module with the host controller circuit to interface with the controller driver based on a second interface protocol;
  establish an HCI network with the first transmission module to allow card emulation application with a UICC or Secure Element;

processes the actual data exchange during the card emulation application between the UICC or Secure Element and a peer device using the previously established HCI network during card emulation with a second transmission module of the NFC controller circuit without the involvement of the host controller circuit.

This "split stack" architecture moves tasks or parts of the Near Field Communication type application that are none-time critical and/or memory consuming from the NFC controller circuit into the host controller circuit. Time critical and performance critical tasks or parts of the Near Field Communication type application are still located within the NFC controller circuit to ensure correct communication towards the Near Field Communication contactless interface. In addition to that very limited other tasks of e.g. recurring processes may be processed by the NFC controller circuit. As a result substantially all of the software stack of the Near Field Communication type application resides within the host processor circuit which is a fast processor with substantial memory resources and directly connected to the device application of the mobile phone with its telephone or WLan data transfer functionality to enable over the air updates of the Near Field Communication type application.

By moving the complete NCI protocol and the establishment of the HCI network, to allow card emulation via UICC into the host controller circuit, removes procedures from the NFC controller circuit while still keeping the device standard compliant. By moving the complete procedure of the actual data exchange into the NFC controller circuit, fast processing is realized, without the need to transfer data over any protocol into the host controller circuit. Both features together enable to achieve that the NFC controller circuit with limited processing power and memory is able to process CE applications fast enough to fulfill the requirements. That is key to ensure a safe and reliable NFC payment feature and other applications (e.g. transport).

These and other aspects of the invention will be apparent from and elucidated with reference to the embodiments described hereinafter. The person skilled in the art will understand that various embodiments may be combined.

DETAILED DESCRIPTION OF EMBODIMENTS

Figure 1:
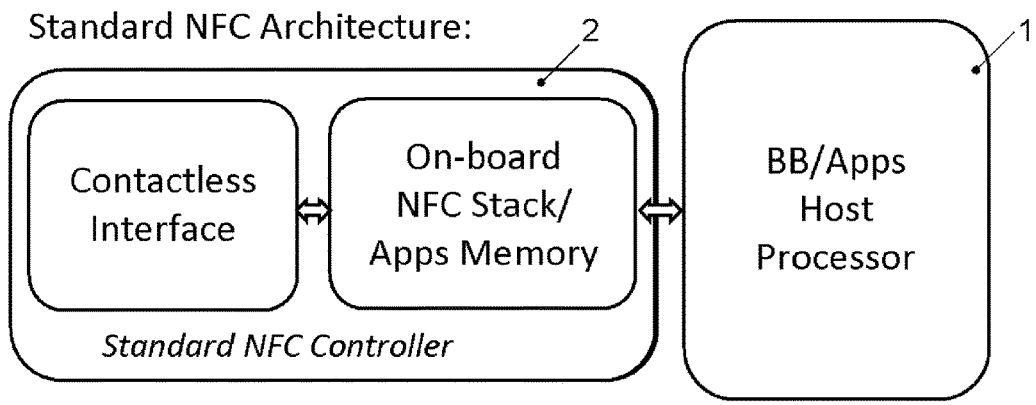
FIGS. 1 and 2 show a standard NFC architecture in a device according to the state of the art.
Figure 2:
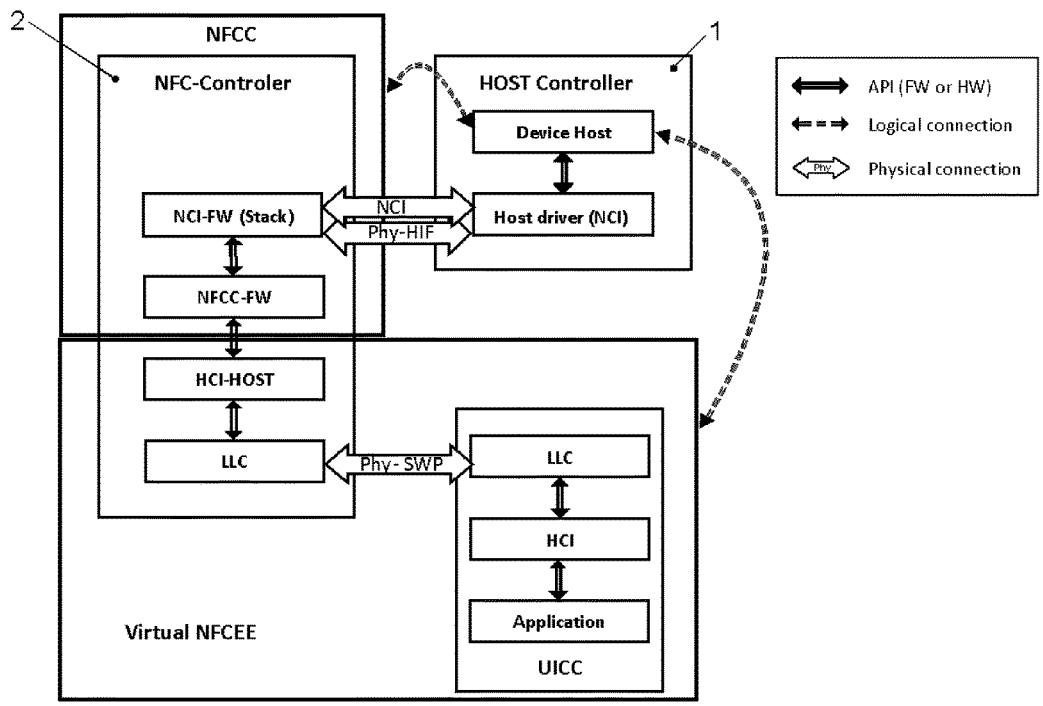
Figure 3:
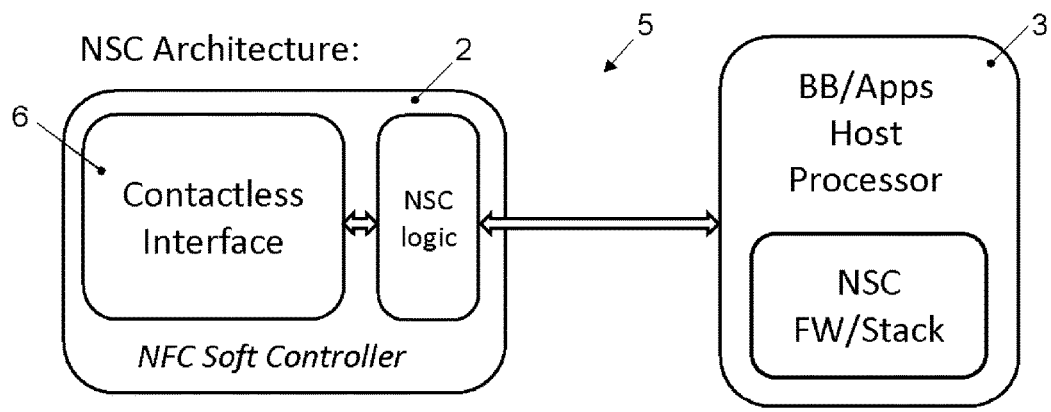
FIGS. 3 and 4 show a "split stack" NFC architecture in a device according to the invention.
Figure 4:
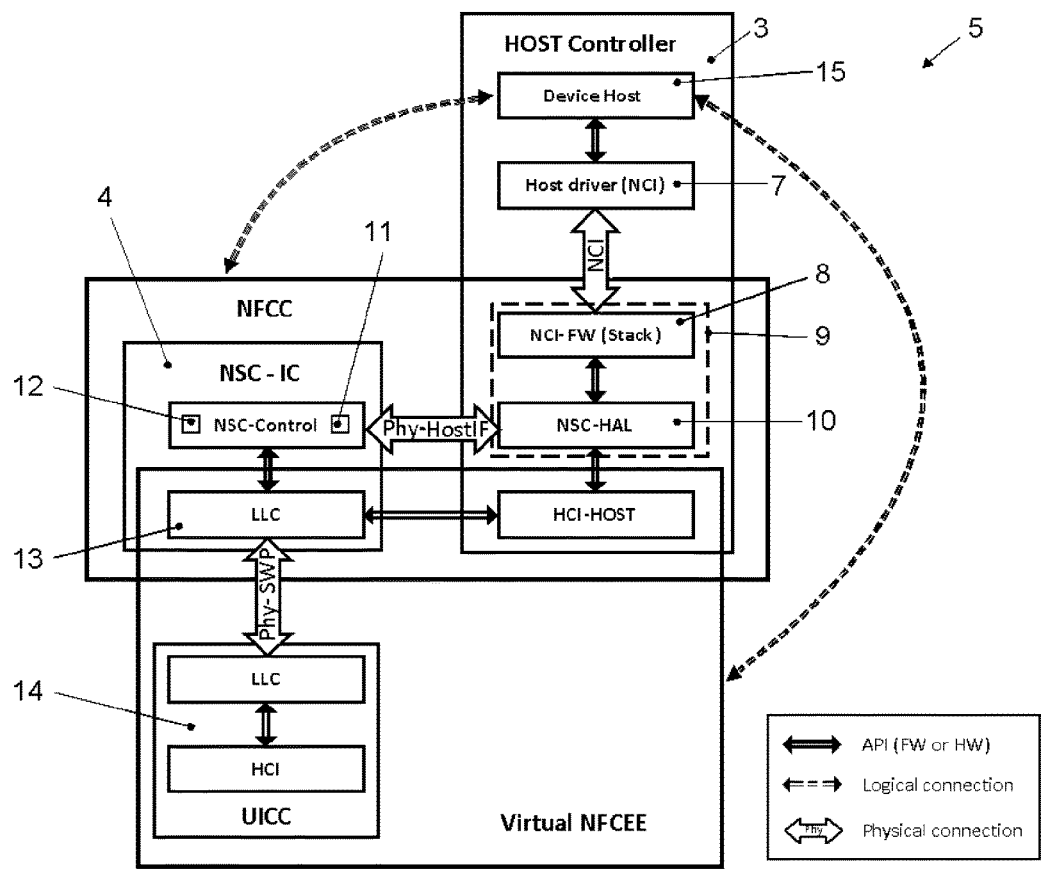

FIGS. 1 and 2 show a host controller circuit 1 and a NFC controller circuit 2 of a state of the art mobile phone as explained above. FIGS. 3 and 4 show a host controller circuit 3 and a NFC controller circuit 4 of a mobile phone 5 with a "split stack" NFC architecture according to the invention. Mobile phone 5 comprises all kind of state of the art modules, not shown in the Figures, to process device applications and realize the normal phone functionalities as for instance to enable to take a call, send a SMS or search the Internet. The host controller circuit 3 is the main processor of the mobile phone 5 that masters all these tasks and interfaces with other integrated circuits of the mobile phone 5 to enable such functionalities.

The NFC controller circuit 4 is one of these other integrated circuits to enable the Near Field Communication feature well known to the man skilled in the art. NFC technology has been developed by an industry consortium under the name of NFC Forum (http://www.nfc-forum.ofg) and derives from RFID technology. The NFC controller circuit 4 is connected to an RFID antenna not shown in the Figures and hosts a contactless interface 6 to communicate with other NFC enabled devices. The over the air NFC contactless interface protocol is standardized in ISO 18092, ISO14443, ISO15693, NFC Forum Specifications and EMVCo and has to be processed in defined timeframes. Further time critical or performance critical tasks are:
  1. Delay time/guard time which means to transmit data not too early and not too late.
  2. EMVCo timing for resetting the operating field.
  3. NFC Active Mode collision avoidance.
  4. Timings for Waiting Time Extensions.
  5. Electro magnetic disturbance handling (EMD).

The NFC controller circuit 4 therefore processes time critical tasks or performance critical tasks to realize this NFC contactless interface protocol, what helps to reduce the latency requirements of the host controller circuit.

The NFC Forum Specification "NFC Controller Interface (NCI)" defines the interface protocol to be used to enable communication between the host controller circuit 3 and the NFC controller circuit 4. The host controller circuit 3 implements this NCI Interface with a stack of software named host driver 7 that communicates based on the NCI interface with a stack of software named controller driver 8 (NCI-FW (Stack)). This controller driver 8 as part of a first transmission module 9 processes and implements the NCI interface. Either controller driver 8 or transmission module 9 of host soft driver 10 process all none-time critical and/or memory consuming tasks of a Near Field Communication application of the mobile phone 5. Typical Near Field Communication applications are for instance a card emulation application or a point of sale application what will be explained in more detail based on the embodiments shown in FIGS. 6 to 7 and 10 to 12.

The first transmission module 9 furthermore comprises a host soft driver 10 that communicates with a controller driver or NFC controller soft driver 11 based on a second interface protocol. The NFC controller circuit 4 furthermore comprises a second transmission module 12 that processes all time critical tasks for the Near Field Communication type application towards the Near Field Communication type contactless interface 6. In addition to that the second transmission module 12 may also process recurring tasks or tasks which influence to overall throughput time. The NFC controller circuit 4 as shown in FIG. 4 furthermore comprises a logic link layer 13 to interface over a Single Wire Protocol with a smart card 14.

The "split stack" NFC architecture of the host controller circuit 3 and the NFC controller circuit 4 as shown in FIGS. 3 and 4 has the advantage that the second transmission module 12 is only a relative small stack of software that has to be processed by the NFC controller circuit 4 to realize the time critical tasks or performance critical tasks to enable the Near Field Communication application. All other none-time critical tasks and memory or data consuming task of the Near Field Communication application are processed within the first transmission module 9 with the host controller 3 that has high processing power, enough memory space and an easy linkage to other functionalities of the mobile phone 5. As a result software stack that has to be processed by the NFC controller 4 based on the state of the art standard NFC architecture is moved into the host controller 3.

The firmware update is much easier with the "split stack" NFC architecture compared to the NFC standard architecture. For example firmware update in the "split stack" NFC architecture is under full control of the host controller circuit 3 and can therefore be updated and checked independently from the NFC controller circuit 4. In the classic approach of the NFC standard architecture the host controller circuit 3 needs to update/copy the new firmware into the 3rd party NFC controller circuit 4. This is usually protected, therefore the NFC-controller circuit 4 manufacturer must provide an interface and a routine to update the firmware on the NFC controller circuit 4. In case something does not work as expected the host-system manufacturer must contact the 3rd party NFC controller manufacturer again to provide a method to get it to work again.

This enables an easy firmware update of the Near Field Communication application and enables to process more powerful Near Field Communication applications in the host controller 3. As the host driver 7 still communicates based on the NFC Controller Interface NCI no changes to the stack of software processed in the device host 15 need to be made when implementing the new "split stack" architecture. This means that the normal phone device applications processed by the device host 15, which device applications use the Near Field Communication applications, do not need to be amended due to the change of architecture.

Figure 5:
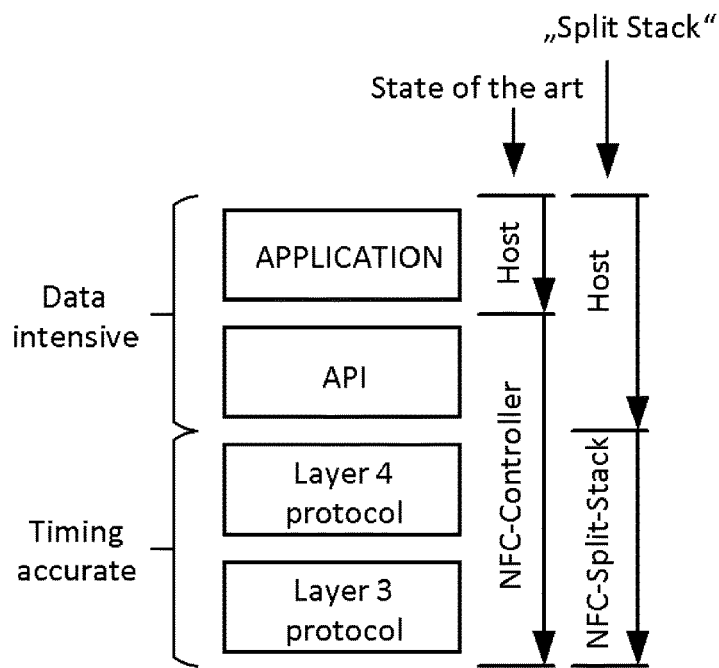
FIG. 5 shows a simplified view which of the tasks or parts of a Near Field Communication application have to be processed in which integrated circuit based on the "split stack" NFC architecture compared to the state of the art standard NFC architecture.

FIG. 5 shows a simplified view of the "split stack" NFC architecture compared to the state of the art standard NFC architecture. As can be seen only the time critical or timing accurate layer 3 and layer 4 protocols still have to be processed within the NFC controller circuit 4, while data intensive or memory consuming tasks of the Near Field Communication application are processed in the host controller circuit 3. A man skilled in the art is able to make a clear decision which of the tasks or parts of a Near Field Communication application are time critical and therefore performance critical and which of them need substantial memory space to decide where they have to be processed.

Figure 6:
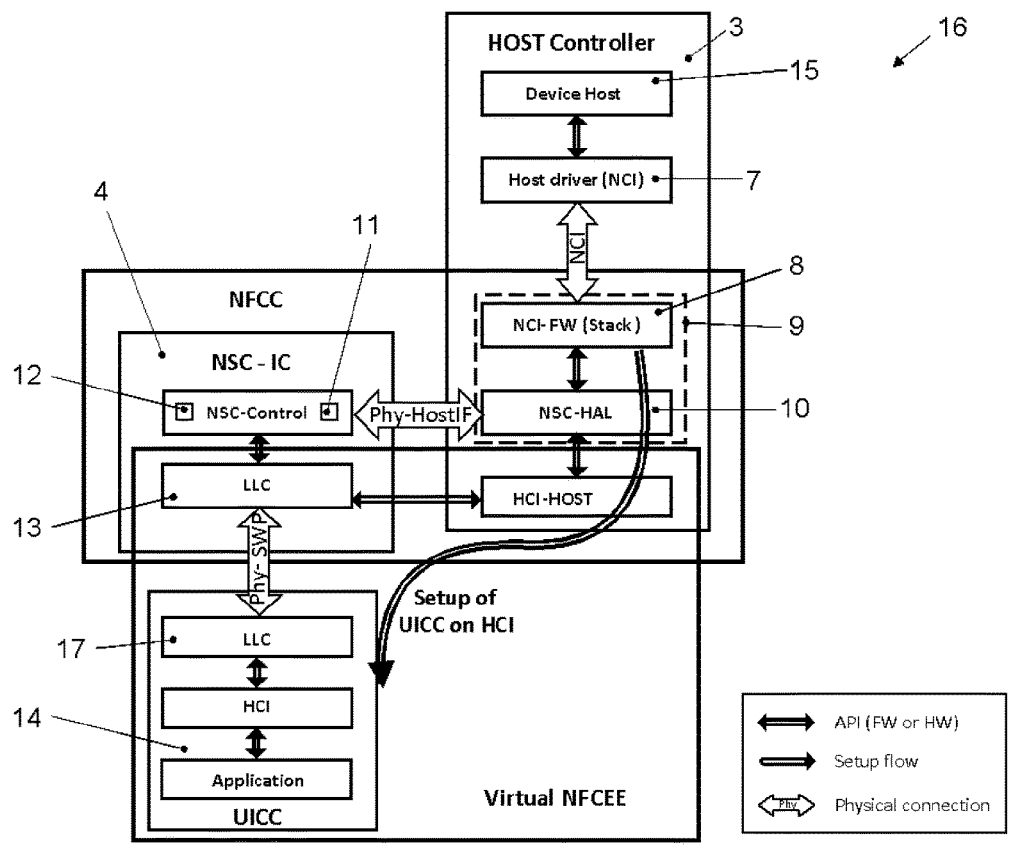
FIGS. 6 and 7 disclose how a device with the "split stack" NFC architecture processes a Near Field Communication application to emulate a smart card via a smart card as secure element.
Figure 7:
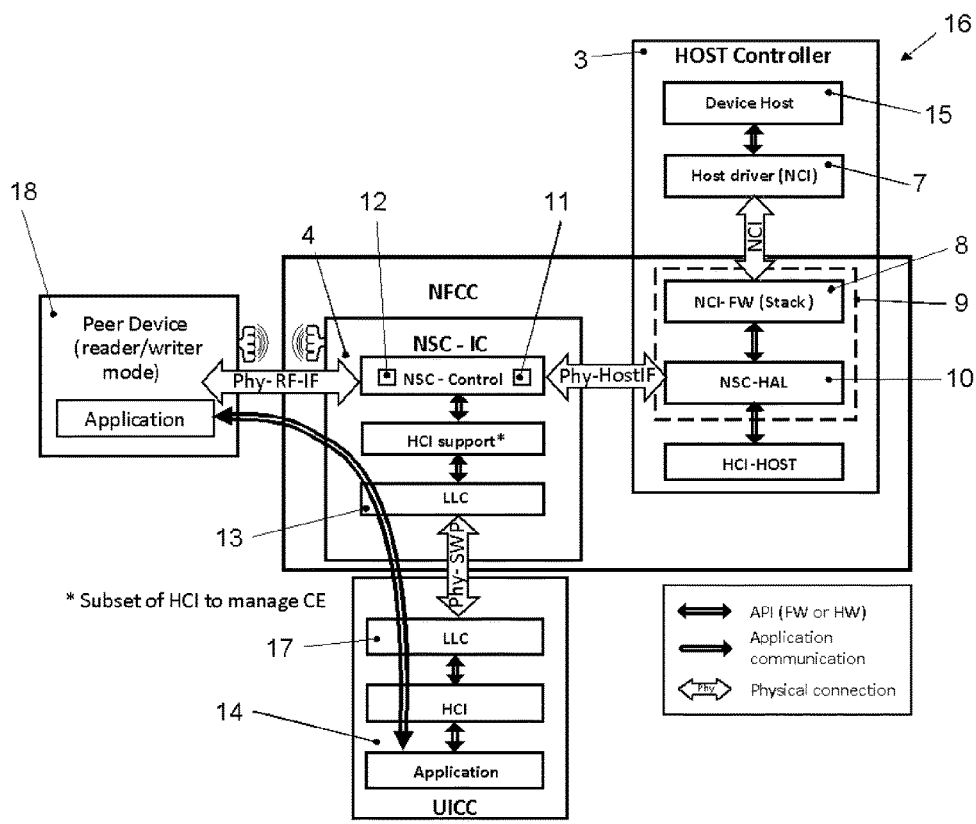

Card Emulation Via Smart Card (UICC) with a Device with "Split Stack" NFC Architecture FIGS. 6 and 7 disclose one of the most important applications for a device 16 that processes a Near Field Communication application to emulate a smart card via a UICC as secure element. FIG. 6 shows the way of the setup of UICC on HCI. In order to allow card emulation via the UICC a connection via the HCI network needs to be established. This is done via the HCI-Host implementation in the host controller circuit 3. The physical connection (usually a Single Wire Protocol SWP) as well as the logic link layer 17 of the smart card 14 are time critical tasks of the Near Field Communication application and therefore handled on the NFC controller circuit 4.

FIG. 7 shows the card emulation via HCI after the connection with the smart card 14 is established. The NFC controller circuit 4 handles the connection and communication between an external reader/writer 18 and the smart card 14. Any other HCI communication not related to the card emulation must be handled by the transmission module 9 in the host controller circuit 3. With this card emulation mode via the smart card 14 all communication mechanisms like standard Layer 4 communication of CLF-mode are supported.

This "split stack" NFC architecture comprises the advantage for the card emulation application that only a small subset of the stack for the Near Field Communication application with the time critical tasks and maybe some small recurring tasks have to be processed in the NFC controller circuit 4, which speeds-up the overall performance and eases firmware-updates of the Near Field Communication application.

Point of Sale Solution with a Device with "Split Stack" NFC Architecture

Figure 8:
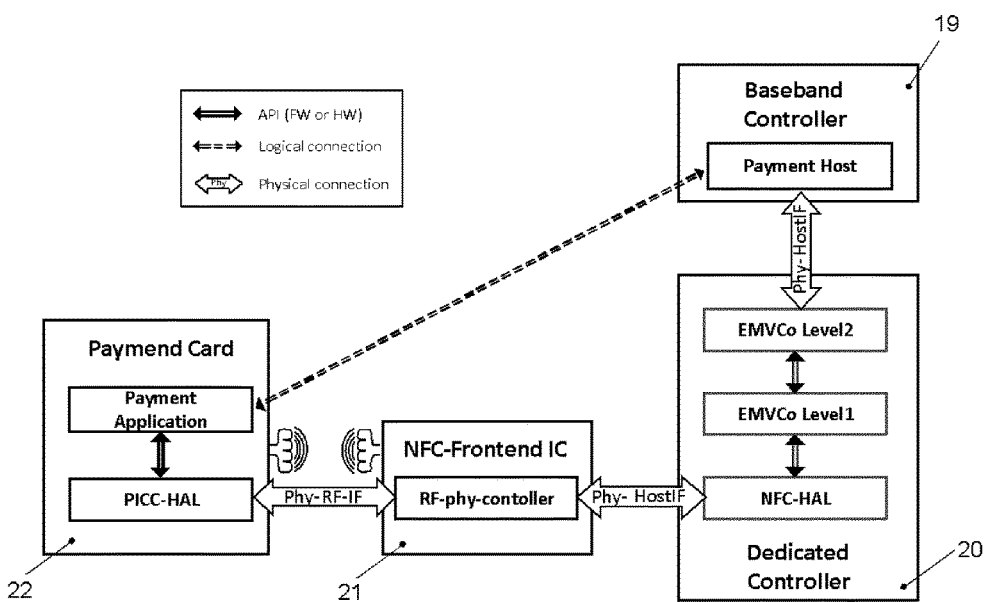
FIGS. 8 and 9 disclose two different state of the art approaches how to process a point of sale Near Field Communication application with a device with a standard NFC architecture.
Figure 9:
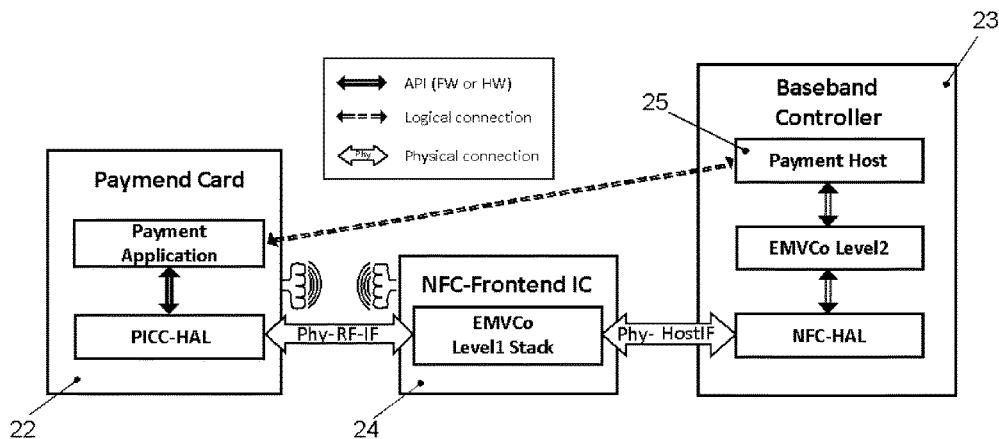

FIGS. 8 to 11 disclose another important Near Field Communication application, a point of sale solution. FIGS. 8 and 9 disclose two different state of the art approaches, namely the NFC frontend approach in FIG. 8 and the NFC controller approach in FIG. 9, while FIG. 10 discloses the new inventive approach for a point of sale solution based on the "split stack" NFC architecture.

In the state of the art NFC frontend approach disclosed in FIG. 8 three integrated circuits (baseband controller 19, dedicated controller 20 and NFC-Frontend IC 21) interface via contact interfaces to process contactless payment of a sale with a payment card 22 as Near Field Communication application. NFC-Frontend IC 21 just enables the contactless interface while the EMVCo Level 1 and Level 2 protocol is processed by the dedicated controller 20.

The state of the art NFC controller approach disclosed in FIG. 9 only uses two integrated circuits, a baseband controller 23 (equivalent to host controller circuit) and a NFC-Controller-IC 24 (equivalent to NFC controller circuit). The NFC-Controller-IC 24 contactless interfaces with payment card 22. Payment host 25 of the baseband controller 23 processes device applications that use the point of sale Near Field communication application partially processed in the baseband controller 23 and partially processed in the EMVCo Level 1 stack of the NFC-Controller-IC 24. The EMVCo Level 1 stack in this standard NFC architecture enables the communication with the baseband controller 23 via the EMVCo interface as controller driver.

EMV is a technical standard for smart payment cards and for payment terminals and automated teller machines that can accept them. EMV cards like the payment card 22 are smart cards which store their data on integrated circuits rather than magnetic stripes. In this point of sale solution shown in FIG. 10 with a device 26 that uses the "split stack" NFC architecture a baseband controller 27 (equivalent to host controller circuit) implements this EMV Interface with a host driver 28 (stack of software named EMVCo Level 2) that communicates based on the EMV interface with a controller driver 29 (stack of software named EMVCo Level 1). This controller driver 29 as part of a first transmission module 30 on the one hand processes and implements the EMV interface and on the other hand processes all none-time critical and/or memory consuming tasks of a Near Field Communication application of the device 26.

The first transmission module 30 furthermore comprises a host soft driver 31 that communicates with a controller driver 32 based on a second interface protocol. The NFC controller circuit 33 furthermore comprises a second transmission module 34 that processes all time critical and performance critical tasks for the point of sale Near Field Communication application towards the Near Field Communication type contactless interface 35. In addition to that the second transmission module 34 may also process recurring tasks or tasks which influence the overall throughput time.

Figure 10:
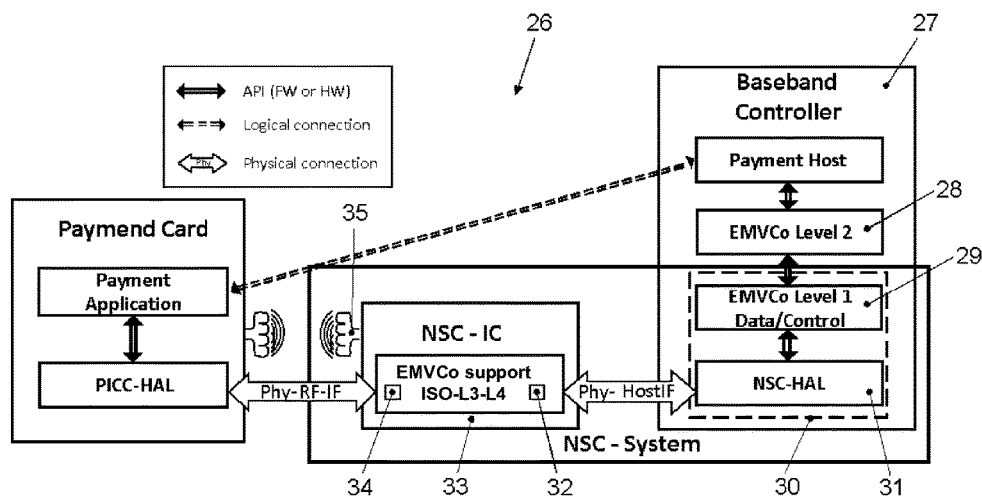
FIG. 10 discloses how a device with the "split stack" NFC architecture processes a point of sale Near Field Communication application.

The "split stack" NFC architecture of the baseband controller 27 and the NFC controller circuit 33 as shown in FIG. 10 has the advantage that the second transmission module 34 is only a relative small stack of software that has to be processed by the NFC controller circuit 33 to realize the time critical and performance critical tasks to enable the Near Field Communication application. All or essentially all other none-time critical tasks and memory or data consuming task of the Near Field Communication application are processed within the first transmission module 30 with the baseband controller 27 that has high processing power, enough memory space and an easy linkage to other functionalities of the device 26. As a result software stack that has to be processed by the NFC-Controller-IC 24 based on the state of the art standard NFC architecture as shown in FIG. 9 is moved into the baseband controller 27 to avoid difficult access via the EMV Interface.

Figure 11:
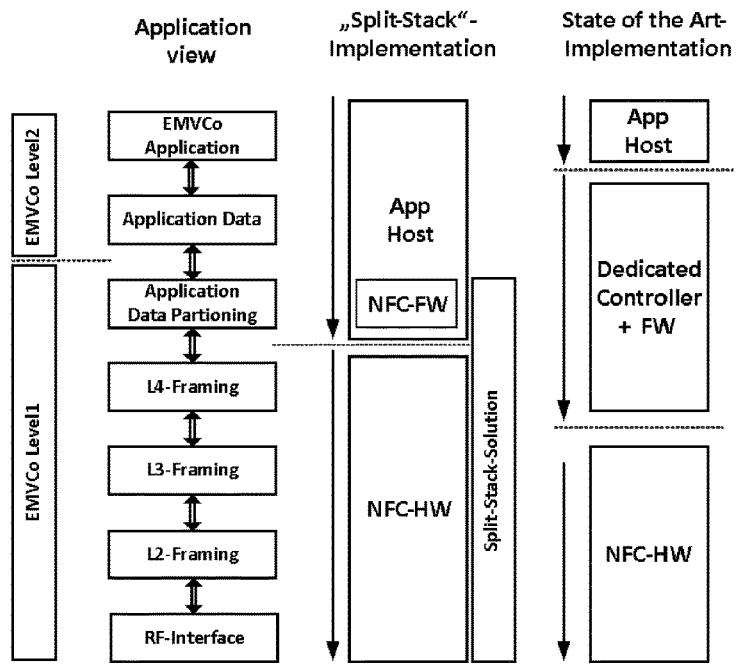
FIG. 11 shows a simplified view which of the tasks or parts of a point of sale Near Field Communication application have to be processed in which integrated circuit based on the "split stack" NFC architecture compared to the state of the art standard NFC architecture.

FIG. 11 shows a simplified view of the "split stack" NFC architecture compared to the state of the art standard NFC architecture for the point of sale Near Field Communication application. As can be seen only the time critical or timing accurate layer 2 to layer 4 protocols still have to be processed within the NFC controller circuit 33, while data intensive or memory consuming tasks of the Near Field Communication application are processed in the baseband controller 27.

Figure 12:
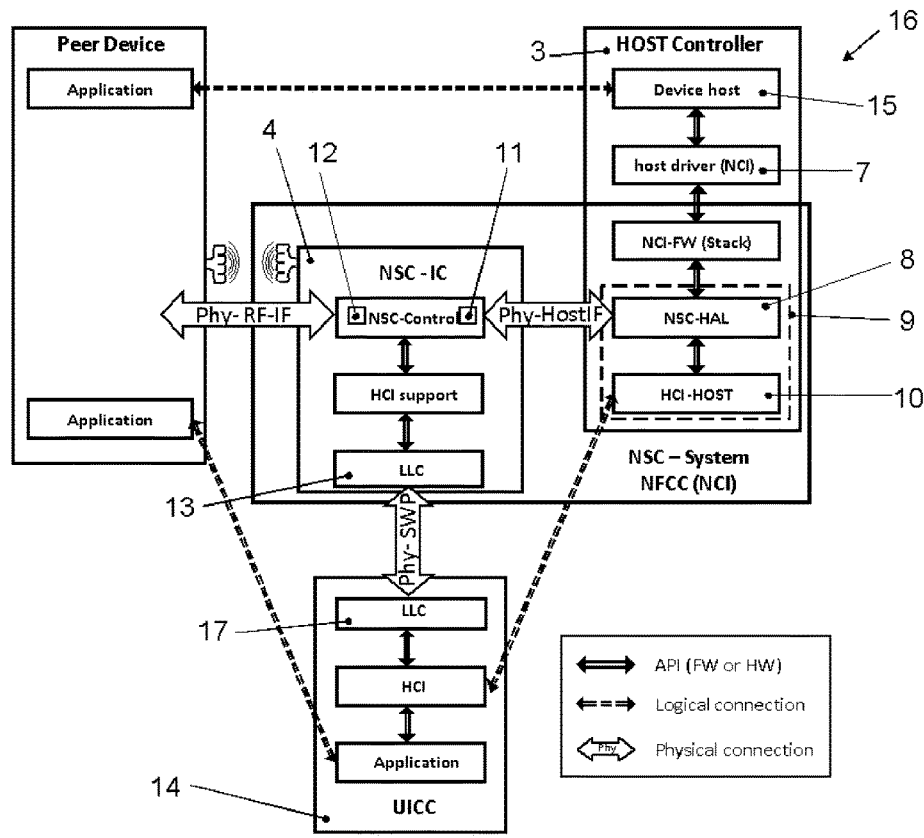
FIG. 12 discloses a system view of a device with a "split stack" NFC architecture on an application level.

The Application View of a Device with "Split Stack" NFC Architecture FIG. 12 discloses a system view of a device with a "split stack" NFC architecture on an application level. With the state of the art standard NFC architecture the NFC controller circuit 2 is the communication center between the application on the peer device and the application on the host controller circuit 1. With the "split stack" NFC architecture the main part of the Near Field Communication application is located on the host controller circuit 3 and the NFC controller circuit 4 with it's NFC controller soft driver 11 and second transmission module 12 mainly connects the different parts. With this new "split stack" NFC architecture the following advantages are achieved:

1) The host controller circuit 3 is able to do direct over the air updates without the traditional limitations of updating the firmware/software processed on the NFC controller circuit 4.
2) The host controller circuit 3 can add and manage multitude of new applications (e.g. from payment applications from Visa, Mastercard etc to royalty cards to ticketing to access control . . . ) without the limitation of the current architecture, namely, the limited memory space and processing power of the NFC controller circuit 4.
3) Space constraint and/or price sensitive devices such as wearables and Internet-of-Things solutions are able to include NFC capability using the existing host controller circuit and without the need of an NFC hardware controller.

In above explained embodiments of the invention the devices 5, 16 and 26 process a method with the following steps:
process substantially all none-time critical and/or memory consuming tasks of the Near Field Communication type application in the host controller circuit 3 or 27 and
process all time critical tasks for the Near Field Communication type application towards the Near Field Communication type contactless interface 6 or 35 in the NFC controller circuit 4 or 33 and
process all firmware for the Near Field Communication type application to be updated by a firmware update independently from the NFC controller circuit.

This method enables to achieve the advantages as explained above with regard to the embodiments of the invention.

It may be stated that devices that process a Near Field Communication type application may not only be mobile phones, but other mobile devices, wearables and IOT devices as well. The invention in particular is advantageous for devices that process a Near Field communication application, but would be advantageous for devices that use similar type of RFID applications as well.

Furthermore it is stated that a NFC controller circuit could be realized by a microprocessor or a dedicated integrated circuit.

The abbreviation NSC in the figures means NFC Soft Controller.

It should be stated that applications are placed either in the host controller or in the secure element. Split stack architecture enables modification of NCI or NFC stack (directly in host controller) to adapt to any new applications. This means for instance that a NFCC functionality can be turned into payment terminal functionality by just reconfiguring the stack.

The low level NFC functionality which is typically time critical and requires real time responses in order to support the RFID communication is integrated in the NSC-IC. It implements mature RFID standards which are very unlikely to change and thus does not require frequent updates of its functionality.

The high level NFC/NCI-FW comprises the higher level of the NFC functionality which is typically non-time critical, but more memory and data intensive. Furthermore, the NCI standard is relatively new and still in development, which results in frequent updates of its functionality. Also, proprietary functionality is often required at this level.

Split Stack allows not just update, but customization of the integration:
In particular, applications that do not "natively talk" NCI will find integration easier (no need to implement NCI). This makes obvious the versatility of the stack and its suitability for NFC/Mobile, payment and infrastructure or transport.

Furthermore there is no need to implement a "Firmware-Downloader", the stack is updated with the manufacture's device SW update.

With regard to the host interface protocol it may be stated that the interface protocol for communication between the NFC controller module and the non-real-time host controller is implemented such that the number of transactions is minimized. In state of the art implementations using an NFC-Frontend the host controller must perform a great number of accesses to get status information and perform configuration. Therefore the FW was moved on-chip to allow usage of NFC controllers in non-real-time systems. The NSC device collects and processes status information in such a way that only a minimum number of transactions between the NFC controller and the host controller is necessary. In the same way the control information sent from the host controller to the NSC is optimized. This aspect is very important as a non-real-time controller adds a significant latency to every transaction which would otherwise slow down the overall processing time.

State of the art architectures require huge overhead for testing, reviews, inspection and overall development and repeatability checks due to embedded ARM firmware in very constrained environment. Being limited in resources introduces constraints for adding new features. The claimed split stack architecture uses component based (for comprehensive testing and validation), layered stack (separating protocol logic from I/O for easy debugging) requiring little overhead and faster overall development and repeatability checks, which is critical for IOT (Inter-Operability-Tests).

It has to be stated that the term "software" that resides in the NSC controller has to be interpreted in that way that this small stack of software could also be referred as hardware accelerator or function of logic. As there is no need to update this software it could be realized in hardware as well what provides a substantial advantage of the invention.

The invention claimed is:

1. A device that processes a Near Field Communication type application, the device comprising:
   a host controller circuit that processes device applications, that use the Near Field Communication type application, and that processes a host driver that communicates based on a first interface protocol (NCI); and
   a NFC controller circuit that processes a Near Field Communication type contactless interface and a controller driver that interfaces with the host controller circuit, wherein
   the host controller circuit processes a first transmission module with a controller driver, that interfaces with the host driver based on the first interface protocol, (NCI), and with a host soft driver, that interfaces with the controller driver based on a second interface protocol, which first transmission module (9) furthermore processes the establishment of an HCI network to allow card emulation with a UICC or Secure Element and wherein the NFC controller circuit comprises a second transmission module that processes the actual data exchange during card emulation application between the UICC or Secure Element and a peer device using the previously established HCI network during card emulation without the involvement of the host controller circuit, and wherein firmware for the Near Field Communication type application to be updated by a firmware update resides within a non-real-time host controlled circuit.

2. The device according to claim 1, wherein the first interface protocol is the "NFC Controller Interface (NCI)" specified in a NFC Forum Specification.

3. The device according to claim 1, wherein the first interface protocol is the "EMV Contactless Specifications for Payment Systems" based on ISO/IEC 7816 and ISO/IEC 14443 or another proprietary interface protocol.

4. The device according to claim 1, wherein the host controller circuit or the NFC controller circuit processes a logic link control layer for a contact interface with a smart card and wherein the first transmission module or the NFC controller circuit processes a host controller interface to emulate a smart card for the device application.

5. A chipset for a device that processes a Near Field Communication type application, characterized in, that the chipset comprises a host controller circuit and the NFC controller circuit as claimed in claim 1.

6. A method to process a Near Field Communication type application to emulate a smart card via a UICC as secure element with a device that comprises:
   a host controller circuit that processes device applications, that use the Near Field Communication type application, and that processes a host driver that communicates based on a first interface protocol (NCI; EMV) and
   a NFC controller circuit that processes a Near Field Communication type contactless interface and a controller driver that interfaces with the host controller circuit, wherein firmware for the Near Field Communication type application to be updated by a firmware update resides within a non-real-time host controller circuit, and wherein the following steps are processed:
   process a controller driver of a first transmission module with the host controller circuit to interface with the host driver based on the first interface protocol (NCI);
   process a host soft driver of the first transmission module with the host controller circuit to interface with the controller driver based on a second interface protocol;
   establish an HCI network with the first transmission module to allow card emulation application with a UICC or Secure Element; and
   process the actual data exchange during the card emulation application between the UICC or Secure Element and a peer device using the previously established HCI network during card emulation with a second transmission module of the NFC controller circuit without the involvement of the host controller circuit.

7. The method according to claim 6, wherein the following step is processed:
   process the firmware for the Near Field Communication type application to be updated by the firmware update independently from the NFC controller circuit.

8. The method according to claim 6, wherein the following steps are processed:
   process a first interface protocol to transmit information relevant for the Near Field Communication type application within the host controller circuit and
   process a second transmission protocol to transmit information relevant for the Near Field Communication type application between the host controller circuit and the NFC controller circuit.

9. The method according to claim 7, wherein the following steps are processed:
   process the "NFC Controller Interface (NCI)" specified in a NFC Forum Specification as first interface protocol.

10. Method according to claim 7, wherein the following steps are processed:
    process the "EMV Contactless Specifications for Payment Systems" based on ISO/IEC 7816 and ISO/IEC 14443 as first interface protocol or another proprietary interface protocol.

* * * * *